United States Patent [19]

Miyashita et al.

[11] Patent Number: 4,737,332

[45] Date of Patent: Apr. 12, 1988

[54] METHOD FOR REMOVING THE DISPERSION MEDIUM FROM A MOLDED PULVERULENT MATERIAL

[75] Inventors: Tsuneo Miyashita; Yasushi Ueno; Hiroaki Nishio; Shoji Kubodera, all of Yokohama, Japan

[73] Assignee: Nippon Kokan Kabushiki Kaisha, Tokyo, Japan

[21] Appl. No.: 862,961

[22] Filed: May 13, 1986

[30] Foreign Application Priority Data

May 14, 1985 [JP] Japan ................... 60-100433

[51] Int. Cl.$^4$ .............. B22F 1/00; B28B 1/14; B28B 11/22; B28C 1/10
[52] U.S. Cl. .............. 264/233; 264/85; 264/344; 419/36
[58] Field of Search .............. 264/85, 82, 83, 123, 264/128, 344, 63, 65, 233; 419/36, 37, 65

[56] References Cited

U.S. PATENT DOCUMENTS

| | | | |
|---|---|---|---|
| 4,069,060 | 1/1978 | Hayashi et al. | 264/82 |
| 4,197,118 | 4/1980 | Wiech, Jr. | 264/63 |
| 4,248,814 | 2/1981 | Yajima et al. | 264/63 |
| 4,404,166 | 9/1983 | Wieh, Jr. | 264/63 |
| 4,518,398 | 5/1985 | Tanaka et al. | 264/65 |
| 4,597,790 | 7/1986 | Matsui et al. | 419/37 |

*Primary Examiner*—Jan H. Silbaugh
*Assistant Examiner*—Karen D. Kutach
*Attorney, Agent, or Firm*—Fleit, Jacobson, Cohn & Price

[57] ABSTRACT

A method for eliminating a dispersion medium from a molded product obtained by plasticizing-molding or casting-molding one or more of metallic and ceramic powders, wherein the elimination process is carried out in a supercritical liquid carbon dioxide atmosphere without heating to higher temperatures.

2 Claims, No Drawings

METHOD FOR REMOVING THE DISPERSION MEDIUM FROM A MOLDED PULVERULENT MATERIAL

BACKGROUND OF THE INVENTION

1. Field of the Invention

This invention relates to mixing a binder which includes a dispersion medium to metallic or ceramic powders, plasticizing-molding or casting-molding the resulting mixture and eliminating the dispersion medium without causing inconveniences to the resulting molded product.

2. Description of the Prior Art

Heretofore, molded products of complex shape such a small-size machine parts or turbine components are produced in a known manner by resorting to injection molding and by employing metallic powders, such as powders composed of 2% of Ni and 98% of Fe, SUS 316 or sterite powders, powders of ceramics such as alumina, silicium carbide, silicium nitride or zirconia, or a mixture of ceramic powders and powders of metals such as cobalt-tungstene carbide, as starting material.

In general, injection molding is composed of the following steps;

(i) The step of mixing powders of starting materials with a binder including a dispersion medium to give a thermoplastic mixture;

(ii) The step of softening the mixture in a heated cylinder and injecting the thus-softened mixture into a metallic mold;

(iii) the step of opening the metallic mold to take out the molded product;

(iv) the step of de-greasing for eliminating the dispersion medium from the molded product; and (v) the step of calcination for elevating the density of the molded product.

The success of injection molding consisting of these respective steps depends notably on the kind of binder employed in the process. Above all, the yield of the ultimate products is occasionally influenced by whether the binder employed is suited or not.

The purpose of using the dispersion medium in the binder is to impart plasticity of the starting pulverulent material while improving its moldability. In case of poor moldability, flaws such as silver marks, weld lines or sink marks are produced in the molded products.

While moldability can be improved by increasing the amount of the dispersion medium, a large amount of dispersion medium is naturally removed in the degreasing step with the result that flaws such as crevices, deformation or foaming are caused to exist in the molded products.

In practicing the above described molding process, it has been tried to reduce the amount of the dispersion medium to a smallest value possible while using such dispersion medium as will not cause the aforementioned defects during the degreasing step. In general, a mixture of low molecular weight polyethylene, polystyrene, paraffin or fine crystal wax and a minor amount of oil or thermoplastic resin is used as such dispersion medium.

In addition, polypropyrene, polyvinyl alcohol, polyvinyl butyral, polyethylene glycol, methyl cellulose, atactic ethyl cellulose, hydroxy ethyl cellulose or acrylic resin can also be used as the dispersion medium. It has also been customary to add a small amount of stearates into the dispersion medium for improving mold release properties of the molded product.

It is noted that the following difficulties are presented with these conventional dispersion mediums.

(i) In the above method, the dispersion medium is cracked and vaporized off in the degreasing step by heating to a temperature of ca. 400° to 500° C. At this time, it is necessary that the molded product be gradually heated to a preset temperature so that the gas will be evolved with cracking of the dispersion medium at a rate not higher than the rate of gas diffusion into the molded product. When the rate of gas evolution is higher than that of gas diffusion, the pressure in the molded product is increased thus occasionally causing deformation, cracking or foaming. Therefore, a processing time of 70 to 100 hours is usually required in the degreasing step so that the merit of higher productive efficiency proper to the techniques of injection molding is lost.

(ii) While the heating over an extended period of time is required in the degreasing step, the evolved heat is rather low and hence economically difficult to recuperate as effective heat energy. Thus it is discarded as waste heat.

(iii) Although degreasing is terminated with completion of heat cracking of the dispersion medium, it is not possible to remove the grease completely so that small amounts of carbon or oil and fat are left in the dispersion medium. These residual amounts of carbon or oil and fat may cause injury to the properties of the calcined product.

(iv) Since the products recovered from the degreasing process are decomposition products of the dispersion medium and cannot be reused, they are usually discarded, with the result that production costs are correspondingly elevated.

The aforementiond problems yet to be solved are presented not only in the techniques of injection molding but in the techniques of molding of plastic materials in general, such as those of extrusion molding or die casting.

There is also known a casting-molding method for molding of metallic powders, ceramic powders, or a mixture of metallic and ceramic powders. According to this method, a viscous slime of starting powders is cast into a liquid-absorbing mold to form a wall layer to produce the molded product.

For producing the viscous slime of starting powders, the starting powders are mixed with a minor amount of the binder including aqueous dispersion medium such as water and crushed together in a ball mill. The resulting slime can be stirred for several days, adjusted for viscosity or moisture and defoamed in vacua for improving its stability.

A plaster mold is assembled after the mold release agent is applied on the surfaces of the various mold components. The slime prepared in the above described manner is cast into the mold. With the absorption of moisture into the mold, a wall layer is formed on the mold surface and grown with the lapse of time.

For molding a hollow article, excess slime can be discharged when the wall thickness reaches a predetermined value.

Since the mold into which the slime has been cast as described above continues to absorb the moisture, water contents in the wall layer are decreased gradually so that the cast article is increased in hardness and contracted so as to be detached from the mold.

At this time, the cast article is removed and subjected to rough and finish machining steps, followed by drying. The plaster mold from which the cast article has been removed can be dried for repeated usage.

A variety of alcohols can be used besides water as the dispersion medium used for the preparation of the starting slime of the powder mixture.

As mold materials, water permeative mold materials selected from the group of plastic materials superior in mechanical strength or wear resistancy and the metal-ceramic fiber composite materials can be used in place of plaster for the preparation of the water permeative molds.

There is also known a method according to which a core is inserted while the powdered material is tamped, the molding is carried out with the compacted powder mold being with subsequent removal of the core, the mold being destroyed after temination of molding for returning the compacted powders back into the batch of the powdered material. In this case, the powdered material can be advantageously reused.

The major problem in the casting-molding of the metallic and ceramic powders is presented in the drying process. There are two main steps in the drying process. In the first constant-rate drying step, the water is lost from the surface of the cast article, which then undergoes shrinkage corresponding to the volume of the lost water. In the next reduced-rate drying step, the water is vaporized within the molded product. The shrinkage which the molded product undergoes during this step is substantially nil.

With the cast article with variable thicknesses, it takes some additional time until the portion of the cast article with a large thickness is shifted from the constant rate drying to the reduced rate drying, so that shrinkage does not proceed smoothly. In the case of a molded article with a larger thickness, it takes some additional time until the inner part of the article is dried, with the shrinkage on the superficial portions taking place more promptly than that at said inner portion. In this case, the molded article is likely to undergo strain or crevice formation in the course of the drying process.

In order to prevent strain or cracks from occurring, it is necessary that the inner part of the molded product in its entirety be cooled uniformly by using a lower drying temperature. To this effect, natural drying is possibly most preferred. However, natural drying is influenced by climatic conditions and need be carried out over an extended time while also requiring a large floor space and a lot of man-power.

The drying with the aid of hot air is also inconvenient in that the air volume and velocity, temperature and humidity need be maintained at uniform values, while the adequate control is difficult to achieve because of too many setting elements.

There is also known a high frequency drying method, according to which the drying proceeds relatively uniformly. It is however difficult to dry the molded product without producing heat stresses in the respective portions as well as the inner and outer layers of the molded product. Thus, sporadic drying, crevices, cracks or strain is caused to a more or less degree with the result that the yield of the dried product is necessarily lowered.

SUMMARY OF THE INVENTION

The present invention contemplates to eliminate the afornentioned inconvenience in the prior art and provides a method for producing a pulverulent material wherein the dispersion agent in the binder used at the time of molding of a molded product obtained by plasticizing-molding or casting-molding of metallic or ceramic powders is eliminated from said product by extraction in a supercritical carbon dioxide atmosphere.

DETAILED DESCRIPTION OF THE INVENTION

According to the present invention, the molded product still containing the dispersion medium is placed in a supercritical carbon dioxide atmosphere for extracting the dispersion medium.

By the term dispersion medium herein is meant such dispersion medium the totality or the essential portion of which is constituted by lower alcohols such as methyl alcohol, ethyl alcohol, n-propyl alcohol, i-propyl alcohol, n-butyl alcohol, i-butyl alcohol, sec-butyl alcohol or t-butyl alcohol or acetone.

By the term "supercritical" as used herein is meant the state in which the temperature is not lower than the critical temperature for carbon dioxide of 31.1° C. and the pressure is not lower than the critical pressure for carbon dioxide of 75.2 kg/cm$^2$ A.

The carbon dioxide in this state is low in viscosity and has a higher diffusion rate, while presenting no surface tension.

In the conventional method of vaporizing the dispersion medium by heating, the cracking products of the dispersion medium are discharged under the effect of the pressure differential between the inside and outside of the molded product. In case of an excess pressure differential or the nonuniform particle compaction in the inside of the molded product, the latter is subjected to expansion thus causing flaws such as crevices or cracks.

The method of the present invention is based on dispersion according to which the molded product is not heated to a higher temperature but simply placed in and exposed to a supercritical carbon dioxide atmosphere, with the dispersion medium being in contact with the carbon dioxide in the supercritical state and eluted gradually, in such a manner that optimum degreasing can be achieved without any stress application to the inside of the molded article.

The following merits are derived from the above described method for molding the pulverulent material of the present invention.

(i) The dispersion medium can be completely eliminated without any injury to the molded product.

(ii) The time for eliminating the dispersion medium can be reduced to about 1/50th that required in the conventional method.

(iii) Heat energy can be saved since no elevated temperatures are used in the step of eliminating the dispersion medium.

The present invention will be described further by referring to several specific Examples.

EXAMPLE 1

Alumina powders with a mean particle size of 0.7 $\mu$m were filled into a beaker 75 mm in inside diameter and 100 mm in height and a test tube 12 mm in outside diameter was inserted in the center of the beaker. The alumina powders around the test tube were tamped and the test tube was pulled out to produce a mold 12 mm in diameter and 20 mm in depth.

60 weight parts of alumina powders, 39 weight parts of the dispersion medium in which the totality of an essential portion of the dispersion medium is composed of lower aliphatic alcohols and acetone and 1 weight part of polyethylene glycol (PEG) were kneaded together for 24 hours to give a viscous slime which was then cast into the mold and allowed to stand for 8 hours in order to have the slime absorbed into the mold to complete the process of wall formation.

The mold was then collapsed to take out the cylindrical cast product the upper portion of which was cut to give a cylindrical molded product 12 mm in inside diameter and 15 mm in height.

A series of the above described operations were carried out by using eight different kinds of dispersion mediums, that is, methyl alcohol (MeOH), ethyl alcohol (EtOH), n-propyl alcohol (n-PrOH), i-propyl alcohol (i-PrOH), n-butyl alcohol (n-BuOH), i-butyl alcohol (i-BuOH), S-butyl alcohol (S-BuOH) and acetone ($Me_2CO$) for each such operation.

The thus-obtained cylindrical products were maintained in the respective extraction tanks, into which liquefied carbon dioxide preheated to 40° C. and supplied to elevate the pressure of 400 atm. in the tanks so as to create a supercritical state which was maintained for one hour to carry out extraction. The supply of liquefied carbon dioxide was then discontinued and the pressure in the tanks was restored in one hour to ambient pressure. The lowering in pressure need be carried out only gradually in order to prevent destruction of the molded product caused by rapid expansion of carbon dioxide in the molded product.

After the termination of desorption of the dispersion medium as described above, no changes such as cracks, crevices or deformation were observed in the eight molded products. It was also found from the weight difference before and after elimination of the dispersion medium that the weight reduction was caused in an amount about equal to the amount of the dispersion medium employed in the desorptive operation.

EXAMPLE 2

A mixture containing 1 weight % of PEG, 27 weight % of t-BuOH and 71 weight % of a starting powder mixture consisting of 92 weight parts of pulverulent silicium nitride with a mean particle size of 0.75 μm, 6 weight parts of yttria and 2 weight parts of alumina, was kneaded together in a pressurized kneader maintained at 30° C., while being simultaneously degassed and compacted together, and the plasticized kneaded product was taken out after 12 hours. The kneaded product was molded into a substantially parallelepidic shape and placed in a metallic mold set to a temperature of 20° C. The product was compressed in a mold at once and maintained in the compressed state for 3 minutes. The molded product was then released from the mold. The product could be released easily from the mold because t-BuOH used as the dispersion medium was solidified at this time.

Two molded products with a size of 43.8×14.8×19.1 mm and 43.8×7.4×1.91 mm were prepared by the above described molding operation.

These molded products were placed in the extraction tank into which liquefied carbon dioxide was supplied and heated to 40° C. so as to create a supercritical state of 300 atm. which was maintained for one hour.

The reduction in pressure was carried out in the same manner as in Example 1 to give molded products freed of the dispersion medium. No abnormalities were observed in these molded products.

It was also found that the difference in the weight of the molded products before and after elimination of the dispersion medium was about equal to the amount of the t-BuOH used as the dispersion medium employed in the molded products.

EXAMPLE 3

In the ultimate stage of the kneading operation in Example 2, kneading was carried out for 30 minutes to give a kneaded product in the form of pellets while the kneaded product was cooled with cold water of 20° C. circulated in the kneader.

Two different kinds of the molded product of the same form as in Example 2 were obtained by molding these pellets by using a screw-in-line type injection molding machine, the metallic mold of which was set to a temperature of 20° C.

The thus-obtained molded products were placed in an extraction tank into which liquefied carbon dioxide was pumped and pre-heated to 40° C., while the pressure in the tank was set to 200 atm, so as to create a supercritical state which was maintained for one hour.

After the lowering in pressure in the manner as described in Example 1, the difference in weight of the molded product was measured before and after degreasing. It was found that the reduction in weight was caused in an amount about equal to the amount of t-BuOH used as the dispersion medium employed in the molded product.

EXAMPLE 4

A mixture of starting materials consisting of 85 weight parts of SUS 316 powders 5 to 20 μm in diameter, 14 weight parts of t-BuOH and 1 weight part of ethylene glycol was prepared and molded into two different kinds of the molded product of the same form under the same conditions of injection molding as those used in Example 3. The processing for elimination of the dispersion medium of the molded products under the same conditions as those used in Example 3.

No unusualities were observed in the molded product after the elimination of the dispersion medium, while the reduction in weight caused by the elimination of t-BuOH used as the dispersion medium was about equal to the amount of the dispersion medium employed.

EXAMPLE 5

A mixture of starting materials consisting of 90 weight parts of tungstene carbide with mean particle size of 1.5 μm, and 10 weight parts of cobalt with the mean particle size of 1.3 μm, was charged into a wet type ball mill (a stainless steel pot with WC-Co alloy balls). Into the ball mill was also charged acetone and the resulting mixture was further mixed and crushed for 48 hours. The resulting product was dried.

The resulting mixture consisting of 91 weight % of the starting powders, 8 weight % of t-BuOH and 1 weight % of PEG was processed as in Example 4 to give two different kinds of the molded products.

These molded products were then processed in the similar manner for eliminating the t-BuOH used as the dispersion medium. The reduction in weight caused by the processing for eliminating the dispersion medium was about equal to the amount of the dispersion medium employed.

What is claimed is:

1. A method for molding a pulverulent material comprising the steps of molding a mixture by plasticizing-molding or casting-molding to form a molded product, said mixture comprising metallic or ceramic powders and a binder which includes a dispersion medium, and eliminating said dispersion medium from said molded product without heating to a higher temperature by elution of said dispersion medium in a supercritical liquid carbon dioxide atmosphere.

2. A method according to claim 1 wherein the totality or an essential portion of the dispersion medium is composed of lower aliphatic alcohols or acetone.

* * * * *